(12) United States Patent
Ould et al.

(10) Patent No.: US 8,195,310 B2
(45) Date of Patent: Jun. 5, 2012

(54) GENERATION OF A CNC MACHINE TOOL CONTROL PROGRAM

(75) Inventors: John Charles Ould, Backwell Farleigh (GB); Sam Hawke Whale, Nailsworth (GB); Kevin James Tett, Bristol (GB); Matthew James Powley, Bristol (GB); Alexander Edward Kane, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 1162 days.

(21) Appl. No.: 11/629,071

(22) PCT Filed: Jun. 28, 2005

(86) PCT No.: PCT/GB2005/002528
§ 371 (c)(1),
(2), (4) Date: Dec. 11, 2006

(87) PCT Pub. No.: WO2006/003380
PCT Pub. Date: Jan. 12, 2006

(65) Prior Publication Data
US 2007/0250204 A1    Oct. 25, 2007

(30) Foreign Application Priority Data
Jun. 30, 2004  (GB) .................................. 0414649.4

(51) Int. Cl.
*G05B 19/18*  (2006.01)
(52) U.S. Cl. ............. 700/18; 700/17; 700/95; 717/104; 715/764

(58) Field of Classification Search .......... 700/179–182, 700/184; 715/762–810; 717/113–162
See application file for complete search history.

(56) References Cited

U.S. PATENT DOCUMENTS

| | | | |
|---|---|---|---|
| 4,974,165 A | 11/1990 | Locke et al. | |
| 5,970,431 A | 10/1999 | He | |
| 6,219,628 B1 * | 4/2001 | Kodosky et al. | 703/2 |
| 7,000,191 B2 * | 2/2006 | Schmitt et al. | 715/764 |
| 7,089,531 B2 | 8/2006 | Rutkowski | |
| 7,210,117 B2 * | 4/2007 | Kudukoli et al. | 717/100 |
| 7,308,334 B2 * | 12/2007 | Tasker et al. | 700/180 |
| 7,574,690 B2 * | 8/2009 | Shah et al. | 717/104 |

FOREIGN PATENT DOCUMENTS

| | | |
|---|---|---|
| EP | 0 072 687 A2 | 2/1983 |
| EP | 0 879 674 A1 | 11/1998 |

(Continued)

OTHER PUBLICATIONS

"In Touch With Technology" Acramatic® 2100 CNC http://www.sea.siemens.corn/mes/mt/support/A21Dwn/Brochr/WPmgr.pdf , pre-1998.

(Continued)

*Primary Examiner* — Dave Robertson
(74) *Attorney, Agent, or Firm* — Oliff & Berridge, PLC

(57) ABSTRACT

A machine tool program editor is used to insert auxiliary operations e.g. measurement, process control and program logic into a CNC work producing program. The editor has representations of the operations which can be placed in the correct position in the program. User input in the form of parameters is prompted when a representation is selected. The program is post processed and run on a machine tool whereat the operations are performed.

12 Claims, 3 Drawing Sheets

FOREIGN PATENT DOCUMENTS

| | | |
|---|---|---|
| EP | 1 300 740 A1 | 4/2003 |
| GB | 1 244 624 | 9/1971 |
| JP | A-60-79209 | 5/1985 |
| JP | A 60-079209 | 5/1985 |
| JP | A-7-227738 | 8/1995 |
| JP | A-2002-529843 | 9/2002 |
| WO | WO 00/28393 | 5/2000 |

OTHER PUBLICATIONS

Zhou, E.P. et al. "Effecting in-cycle measurement with preteritic CNC machine tools," Computers in Industry, vol. 28, 95-102 pp (May 1996).

Schwermer, K.U. et al. "Exteme Werkzeugvermessung beim CNC-Werkzeugschleifen," CIM Zeitschrift fur Wirtschaftliche Fertigung und Automatisierung, vol. 88, No. 4, Munich, 176-179 pp (Apr. 1993).

"Schnelle NC-Programmierung fur optische Messmachinen," WT Produktion und Management, vol. 82 66-68 pp (Sep. 1992). (English translation attached).

Merat, Francis L., et al. "Automated Inspection Planning within the Rapid Design System," IEEE, 42-48 pp (1991).

"KMG automatisch programmieren," 449 F&M Feinwerktechnik & Messtecknik, vol. 102, No. 4, 181-186 pp (Apr. 1994). (English translation attached).

"iTNC 530: The versatile path control system for milling machines, boring mills and machining centres," Oct. 2002 (with translation).

"iTNC 530: User manual DIN-ISO Programming," NC Software 320 420-xx, Apr. 2003 (with translation).

"iTNC 530: Probe system cycle user manual," NC Software 320-420-xx, 320-421-xx, Mar. 2003 (with translation).

Jul. 7, 2011 Communication of Notice of Opposition issued in European Patent Application No. 05759670.2 (with partial translation).

Feb. 8, 2011 Office Action issued in Japanese Patent Application No. 2007-519861 (with translation).

Heidenhain iTNC 530 User's Manual, Heidenhain Conversational Format, 2003.

Heidenhain TNC 426 User's Manual, Heidenhain Conversational Programming, Nov. 1994.

Heidenhain iTNC 530 User's Manual, ISO Programming, 2003.

Heidenhain Touch Probe Cycles iTNC 530 User's Manual, 2002.

\* cited by examiner

GENERATION OF A CNC MACHINE TOOL CONTROL PROGRAM

BACKGROUND

1. Field of the Invention

This invention relates to the generation of CNC machine tool control programs, in particular, the generation of control programs for use in workpiece measurement operations and other operations on such machine tools.

2. Background of the Invention

CNC machine tools generally accept programs in a low level language for example ISO "G" code. These low level language programs can be produced in a number of ways for loading into the memory of a CNC machine tool controller.

A basic way to produce a machine tool program is to create it by writing the program as commands in a text type program editor in a low level language, but this is laborious. CAD/CAM type programs exist which will generate machine cutting instructions automatically from nominal dimensions of a workpiece which is represented in software. A sequence of high level language instructions are created and post-processed to produce cutting programs in a low level language which is usable by a machine tool. The cutting program has a list of G code commands.

Once a program is post-processed it is then possible to edit the program in the low level language. However, a large amount of editing is again laborious. To aid editing, parts of the low level language program can be cut and/or other parts pasted in.

It is advantageous to have workpiece inspection and measurement operations interleaved with the CNC cutting program so that inspection can take place as work progresses. It is known to paste in probe inspection G code commands into a cutting program used on a machine tool or to type the commands directly. However, it is necessary to ensure that the G code commands are in the correct place and suitable for the purpose. For example, pasted inspection commands will have to have the correct positional data, number of points of contact and probe advance/retreat paths. The pasted inspection instructions will need to be checked to ensure they are correct. This is complicated because the G code used is not easy to interpret.

In addition to probe inspection operations, for greater automation, other auxiliary operations are desirable such as process control and program logic operations. It is desirable to insert auxiliary commands in the form of process control commands and program logic commands into the CNC program when the probe inspection commands are added. Usually these commands are required as a result of probing information. Examples of process control commands are, updating machine tool variables that could be used for modifying tool paths later in the CNC program, updating tool variables e.g. cutter diameter or length, or updating work coordinates. Examples of program logic instructions are: if; then; while; else etc., used to make decisions based on probe inspection data.

Inputting all the auxiliary commands mentioned above into a machine tool program, until the advent of this invention, has been very complicated, because manual input of each command was required.

Whilst the automatic generation of commands is known e.g. U.S. Pat. No. 5,970,431 shows its use for carrying out measurement operations on a coordinate measurement machine, there is no provision for adding such commands to a program used for producing a workpiece.

EP 0879674 describes the generation of a machine tool cutting program which has stop codes (M1) for stopping the program in order that the workpiece can be removed for inspection on a conventional co-ordinate measurement machine (CMM).

SUMMARY OF THE INVENTION

According to a first aspect of the invention there is provided a method for generating a CNC program, used for producing a workpiece on a CNC machine tool, having at least one measurement instruction comprising the steps of:

opening a program editor for a CNC machine tool program;

loading a CNC machine tool work producing program into the program editor;

inserting at a selected point in the program a selected measurement instruction for performing one or more measurement operations of the CNC machine tool;

characterised in that, the program editor includes representations not in the language of the CNC program, indicative of the or each measurement operation, and in that the method comprises the further steps of:

selecting a representation of the measurement operation required; and generating and inserting at the selected point in the work producing program the at least one measurement instruction required for carrying out the measurement operation on the CNC machine tool.

Thus embodiments of the invention provide measurement operations e.g. workpiece inspection, tool site, length, position and tool breakage detection, using inspection probes or non-contact detection devices and preferably auxiliary operations such as process control operations and program logic operations all of which need not be manually input but may be selected as a representation (e.g. an icon, menu item, hot key or text instruction) and automatically generated then inserted into the CNC program in the form of the auxiliary instructions necessary for carrying out the auxiliary operations.

The measurement instructions together with the remaining program may be in the form of blocks which are post-processed to produce the machine usable G code commands necessary for performing the desired measurement operations, and workpiece producing commands.

Preferably the selection of the icon etc prompts further user input in the form of parameters of the measurement operations, process control operations or program logic operations.

If the operation is a probing inspection operation then the parameters include, feature geometry, probe path, number of points to inspect, what is to be done with the probing data or tolerances.

If the operation is a process control operation then the parameters include updating machine tool variables e.g. cutting speed, feed and depth of cuts, updating tool variables e.g. cutter diameter or length or updating work coordinates.

If the operation is a program logic operation then the parameters include if, then, while, else and similar instructions.

Preferably the workpiece producing program has a combination of probing inspection operations, process control operations and program logic operations.

The invention extends to a computer program for carrying out the methods described above.

According to a second aspect the invention extends also to a method of producing a workpiece comprising the steps of:

generating a CNC program according to the first aspect;

loading the CNC program into a CNC controller;

running the program, producing the workpiece and carrying out the said at least one measurement operation.

The invention extends to a work producing CNC program for carrying out the method immediately above.

BRIEF DESCRIPTION OF THE DRAWINGS

Embodiments of the invention will now be described with respect to the drawings, wherein.

DETAILED DESCRIPTION

Figure 1:
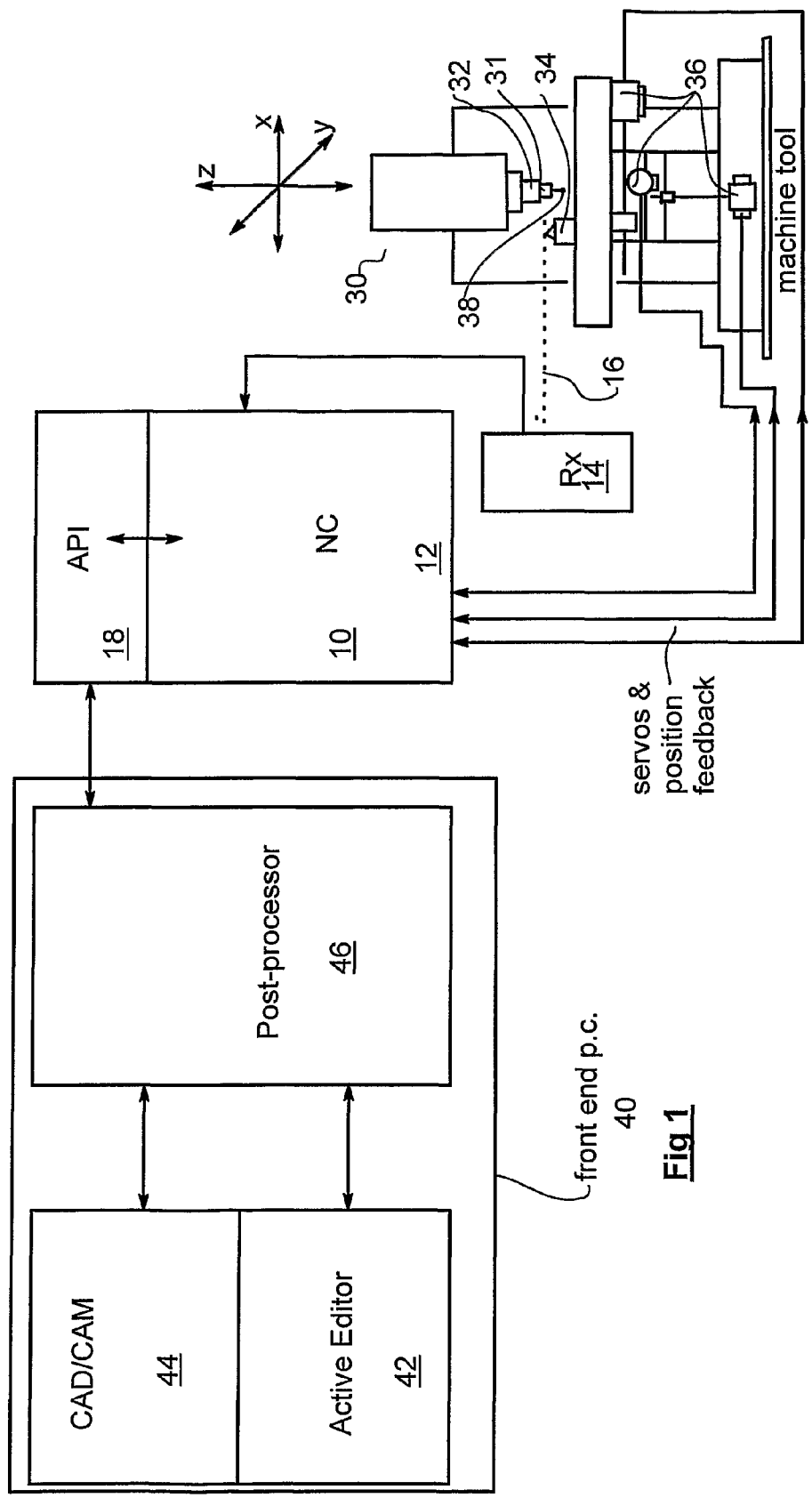
FIG. 1 shows a CNC machine tool having a front end PC in which is resident the CNC machine tool cutting program editor.

FIG. 1 shows a CNC machine tool 30 for cutting (in this instance) a workpiece 34. In order for this to happen the machine is controlled by CNC controller (NC) 10, which in practice is part of the machine tool 3. The NC operates servos 36 and has positional feedback. In order to measure a machined workpiece a measurement probe 31 can be inserted into the cavity normally occupied by a cutting tool. The probe 31 is moved by the NC 10 about the workpiece 34 so that its stylus tip 38 contacts the workpiece at desired locations.

When the stylus tip 38 touches the workpiece 34 a signal is sent to a wireless (in this instance) remote receiver 14 for feedback to the NC 10. Thus with the correct control the probe 31 can measure the workpiece. Its dimensions can be calculated from servo position feedback when a probe signal is received from the receiver 14. The probe is capable of providing signals when it is moved in x, y or z directions.

As described above, conventionally, the programming of moves required to carry out the probing is time consuming and difficult due to the complexities of the low level G code language used and the fact that many variants of that language are used for different machines. Cutting programs can be generated and modified using a conventional CAD/CAM package 44 resident for example in a so-called PC front end which is physically attached to the CNC machine. According to the invention modifications required for probing operations and consequent auxiliary operations can be carried out in the active program editor 42 which forms part of the invention. The program, once modified, is post-processed by post-processor 46 then fed into the memory of the NC 10 via API 18 ready to be used to machine and inspect workpiece 34.

Figure 2:
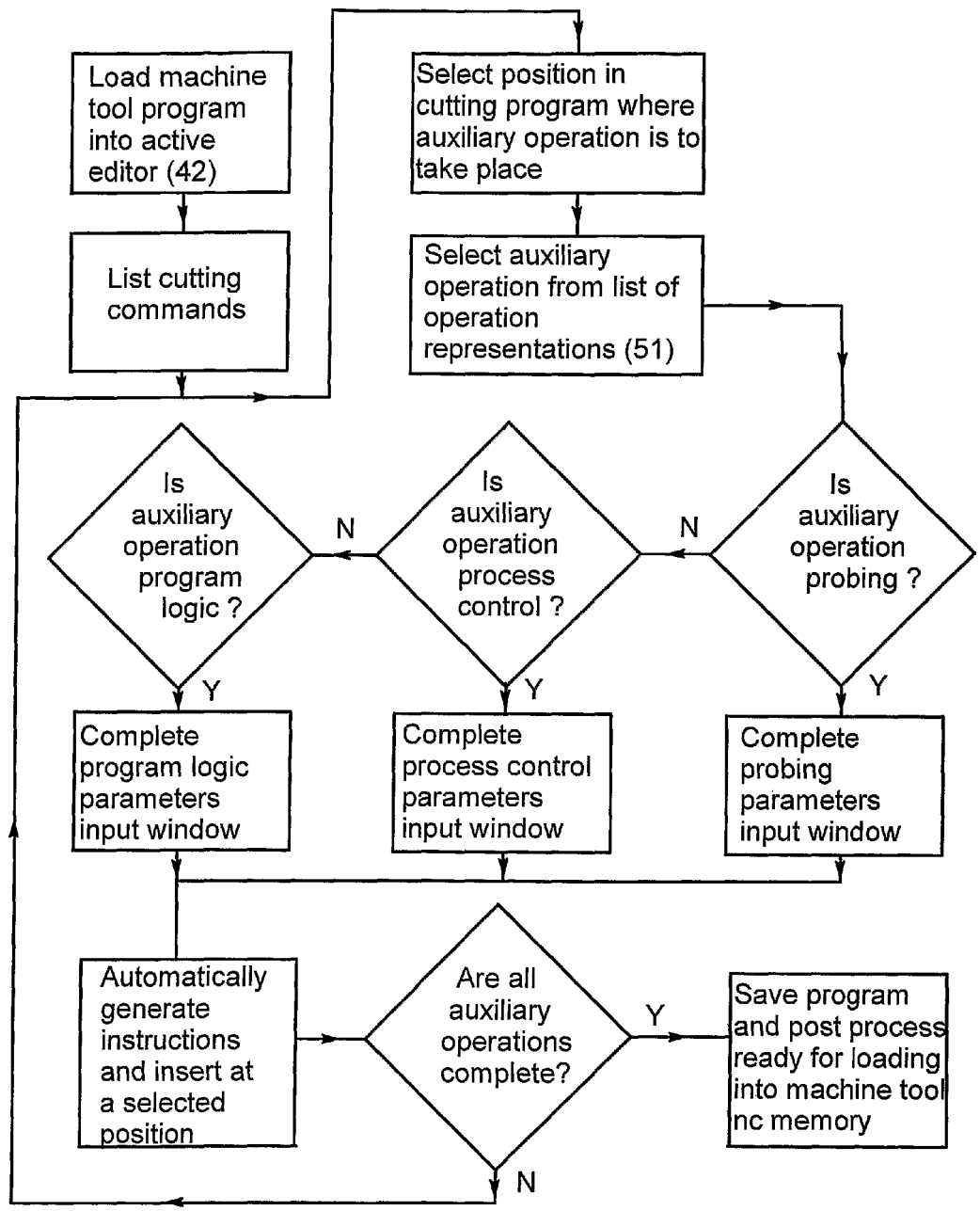
FIG. 2 shows a flow diagram of an example of the generation of a CNC machine tool cutting program according to the invention.

FIG. 2 shows an example of the operations in the editor 42 according to the invention. The active editor 42 will accept cutting tool programs in so-called G code and convert them into an internal language. However, the G code can be displayed on a user screen as a list of cutting commands. Where probing or other auxiliary operations are required the user can select the appropriate point in the G code list and insert instructions. The instructions are inserted by selecting an appropriate icon, menu item or hot key. Once selected the user is prompted to input the parameters of the probing. Once entered the parameters are turned into an instruction list and inserted at the selected point. If other consequential operations are required these to can be inserted in the same way. Once inserted the instructions are post-processed to be converted into G code for loading into the memory of NC 10.

The following is an example of the modification of a machine tool cutting program using the editor described above. This example assumes that it is required to machine a rough casting. The casting has a boss, roughly central to the casting. The required finished size of the boss is 50 mm diameter. The boss size as cast should be between 60 and 75 mm but varies in position. Other features are dimensioned from the centre of the boss.

The cutting program correctly generated from the finished drawing has the correct cutting paths starting with machining of the boss. Since the exact position of the boss is not known then to avoid scrap it would be beneficial to find the centre of the cast boss before machining takes place and then to datum the workpiece coordinates from that centre. This can be done quickly with the editor 42 of the invention simply by loading the cutting program, selecting the external circle inspection icon and setting the parameters to measure slowly in from a 100 m diameter at four points about the approximate centre of the boss. The probing instructions necessary to carry out this operation will be inserted at the start of the cutting program. A process control icon etc can be selected which updates work coordinates to the centre of the boss once the boss has been machined so that the other features can be machined with the correct dimensions. The instructions required for this to happen can be added also.

It may be necessary to add program logic to the cutting program whereby, IF the boss is less than 50 mm in diameter initially THEN stop the machine tool program. The boss is undersize and cannot be machined correctly. The instructions for such operation can be added to the cutting program in the same way as the probing and process control instructions were added. The whole program is post-processed to suit a particular machine tool and loaded into the NC 10 as cutting, probing, process control and program logic commands.

Figure 3:
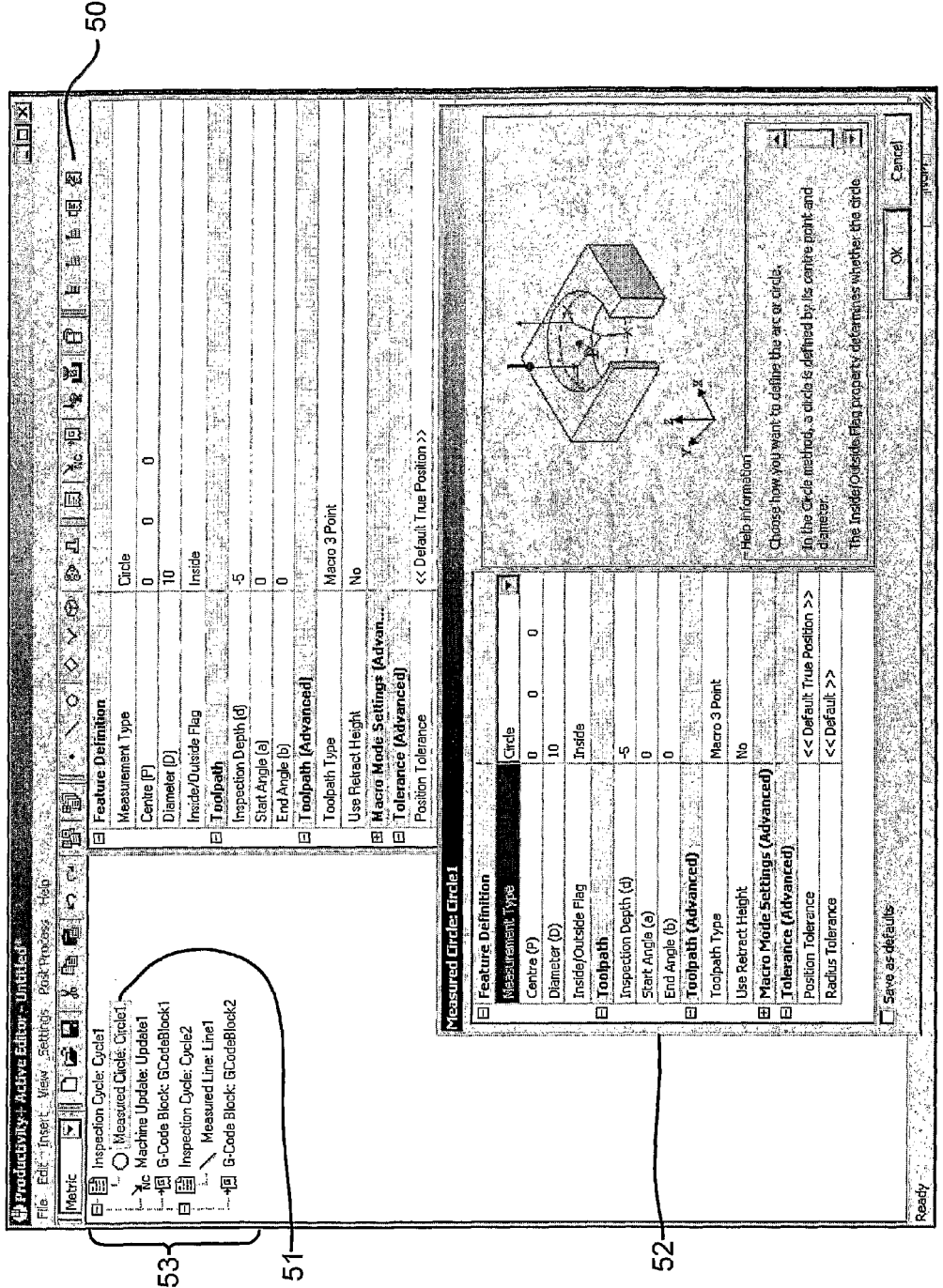
FIG. 3 shows a screen print of the program editor in use during the generation of a CNC machine tool cutting program according to the invention.

FIG. 3 shows a visualisation of the active editor program on a PC screen. Toolbar 50 contains the necessary icons and drop-down menus for selecting the program auxiliary operation mentioned above. In the example shown an internal circle (circle 1) 51 has been selected from the toolbar and inserted as an operation in the instruction blocks 53 representing the G code. Window 52 has been activated which requires input relating to parameters of the circle to be measured. In this instance the nominal centre point and diameter are required as well as the path of inspection. Once input the data is saved at the selected point 51 and further operations can be inserted. When all the operations are complete the whole program can be post-processed to obtain the G code commands. If necessary the program can be reloaded and modified again.

Since it may be difficult to determine exactly where an auxiliary operation should be inserted into a CNC program, an embodiment of the invention incorporates a visualisation of the workpiece and cutting paths of the machine tool at a selected point in the CNC program. So, features of a workpiece which require inspection can be easily identified and the appropriate instructions inserted at the correct place.

Therefore, it is possible using the editor 42 to load a CNC program and to display the features of a workpiece that would be made if the program was run on a CNC machine. The user of the editor may then pick the feature to be inspected and the editor will then automatically insert the appropriate auxiliary instructions in the correct place e.g. following what would be the production of that feature during the running of program on the CNC machine tool.

This embodiment may be used to reverse engineer the data of an existing CNC program, perhaps where no CAD model exists for the workpiece. It is possible to visualise a part just from the CNC program.

The embodiments described relate to the modification of cutting programs on a CNC machine tool. It is envisaged that the invention should extend to the generation of all programs for producing a workpiece including processes other than cutting, for example grinding, welding, polishing, deburring, pressing, forming, folding, stamping, piercing, embossing etc., all of which may be performed on a CNC controlled machine.

The embodiment described refers to probing operations e.g. using a conventional workpiece contact probe. However the invention is concerned with measurement operations in general including but limited to: workpiece contact and non contact surface sensing, surface roughness sensing, camera based measurement systems, measurement gauges, tool size, position sensors and tool breakage detectors.

The invention claimed is:

1. A method for generating a CNC program, used for producing a workpiece on a CNC machine tool, having at least one measurement instruction comprising steps of:
   opening a program editor for a CNC machine tool program;
   loading a pre-generated CNC machine tool program into the program editor, the pre-generated CNC machine tool program being a program that is executable by the CNC machine tool;
   inserting, at a selected point in the pre-generated CNC machine tool program, a selected measurement instruction for performing at least one CNC machine tool measurement operation;
   wherein the program editor includes representations not in a language of the pre-generated CNC machine tool program, indicative of the at least one measurement operation, and
   the method comprises further steps of:
      selecting a representation of the at least one measurement operation required;
      generating and inserting at the selected point in the pre-generated CNC machine tool program the selected measurement instruction, that is not in the language of the CNC machine tool program, required for performing the at least one measurement operation on the CNC machine tool; and
      cost-processing the selected measurement instruction to convert the selected measurement instruction into a CNC machine tool language.

2. A method for generating a CNC program as claimed in claim 1, the method further comprising steps of:
   selecting a representation of process control operations and program logic operations;
   and inserting the representation of process control operations and the program logic operations into the pre-generated CNC machine tool program in a form of auxiliary instructions necessary for carrying out the process control operations and the program logic operations.

3. A method for generating a CNC program as claimed in claim 2 wherein the selected measurement instruction together with the pre-generated CNC machine tool program are in a form of blocks that are post-processed to produce machine usable commands for performing the at least one measurement operation, and workpiece producing commands.

4. A method for generating a CNC program as claimed in claim 1 wherein the selecting the representation prompts user input in a form of parameters of the at least one measurement operation, process control operations or program logic operations.

5. A method for generating a CNC program as claimed in claim 4 wherein the parameters of the at least one measurement operation include, feature geometry, probe path, number of points to inspect, what is to be done with probing data or geometric tolerances.

6. A method for generating a CNC program as claimed in claim 4 wherein the parameters of the process control operations include (1) updating machine tool variables including cutting speed, feed and depth of cuts, (2) updating tool variables including cutter diameter or length, tool geometry, tool wear, or (3) updating work coordinates.

7. A method for generating a CNC program as claimed in claim 4 wherein the parameters of the program logic operations include instructions to control program flow including at least one of, if, then, while and else instructions.

8. A method for generating a CNC program as claimed in claim 2 wherein the pre-generated CNC machine tool program has measurement operations, process control operations and program logic operations.

9. A non-transitory computer readable storage medium encoded with a computer program, which when run on a computer, carries out the method according to claim 1.

10. A method for generating a CNC program as claimed in claim 1, wherein the generating and inserting at the selected point includes a visualization of a workpiece and cutting paths of the CNC machine tool to aid in selecting the selected point.

11. A method of producing a workpiece comprising in any suitable order the steps of:
    generating a CNC program according to claim 1;
    loading the CNC program into a CNC controller;
    running the program, producing the workpiece; and
    carrying out the at least one measurement operation.

12. A non-transitory computer readable storage medium encoded with a work producing CNC program, which when run on a CNC machine tool controller, carries out the method according to claim 11.

* * * * *

UNITED STATES PATENT AND TRADEMARK OFFICE
CERTIFICATE OF CORRECTION

PATENT NO.         : 8,195,310 B2                                    Page 1 of 1
APPLICATION NO.    : 11/629071
DATED              : June 5, 2012
INVENTOR(S)        : John Charles Ould et al.

It is certified that error appears in the above-identified patent and that said Letters Patent is hereby corrected as shown below:

Column 5; Claim 1; Line 43; Please change "cost-processing" to "post-processing"

Signed and Sealed this

Seventh Day of August, 2012

David J. Kappos
*Director of the United States Patent and Trademark Office*